(12) United States Patent
Matsuyama

(10) Patent No.: US 6,747,834 B1
(45) Date of Patent: Jun. 8, 2004

(54) DISK DRIVE, POSITION DETECTION DEVICE AND METHOD OF CORRECTION OF POSITION DETECTION SIGNAL

(75) Inventor: Yasuhiko Matsuyama, Nagasaki (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/576,912

(22) Filed: May 23, 2000

(30) Foreign Application Priority Data

May 27, 1999 (JP) ............................................ P11-148697

(51) Int. Cl.[7] ................................................ G11B 5/596
(52) U.S. Cl. ..................................................... 360/77.03
(58) Field of Search ........................... 360/77.03, 78.04, 360/77.08, 75, 78.06, 294.4; 250/559.29

(56) References Cited

U.S. PATENT DOCUMENTS

| | | | |
|---|---|---|---|
| 4,396,959 A | * 8/1983 | Harrison et al. | 360/77.08 |
| 4,587,579 A | * 5/1986 | Cocke et al. | 360/75 |
| 5,469,414 A | * 11/1995 | Okamura | 360/78.06 |
| 6,072,655 A | * 6/2000 | Uwabo et al. | 360/294.4 |
| 6,151,185 A | * 11/2000 | Ishizuka et al. | 360/78.04 |
| 6,316,779 B1 | * 11/2001 | Tsai | 250/559.29 |

* cited by examiner

Primary Examiner—David Hudspeth
Assistant Examiner—Fred F. Tzeng
(74) Attorney, Agent, or Firm—Robert J. Depke; Holland & Knight LLP

(57) ABSTRACT

A method of correcting a position detection signal with a high precision in a short time and a position detection device able to be made compact and low cost, comprising detectors for outputting position detection signals including two signals having a phase difference of 180 degrees along with movement of an object to be detected and a signal processor for obtaining an offset voltage level by averaging the position detection signals and shifting a position detection signal so that a reference voltage level of a center of amplitude matches the voltage level. Also, the signal processor corrects an amplitude of a position detection signal by using two signals having a phase difference of 90 degrees. For example, after a maximum value of amplitude is obtained from said two signals and a minimum value is obtained by subtracting a voltage difference from the obtained maximum value from the shifted reference voltage level, an amplitude of a position detection signal is expanded or reduced to give the maximum value and minimum value. At this time, a minimum value is obtained by adding absolute values of two signals having a phase difference of 90 degrees.

43 Claims, 7 Drawing Sheets

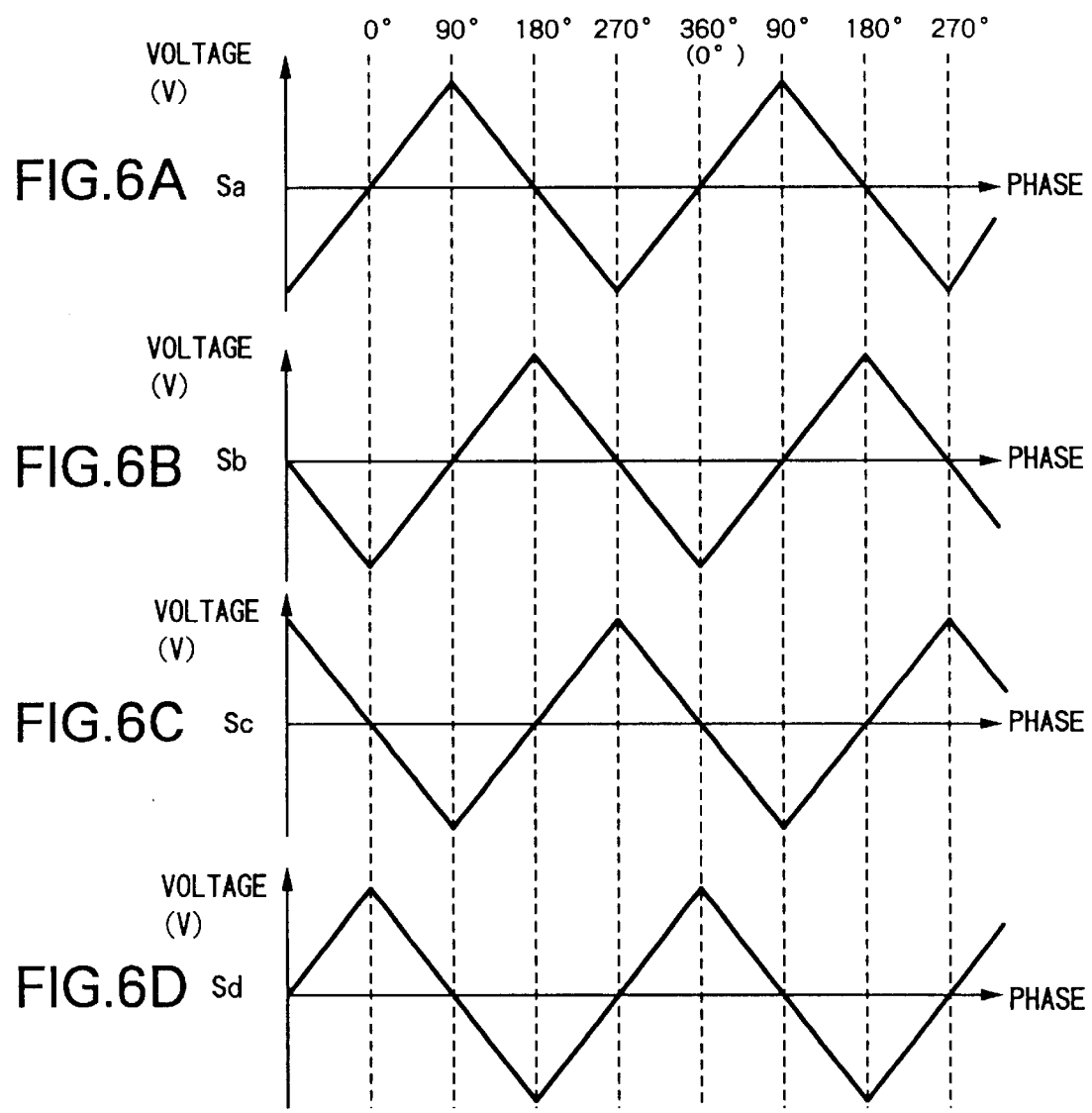

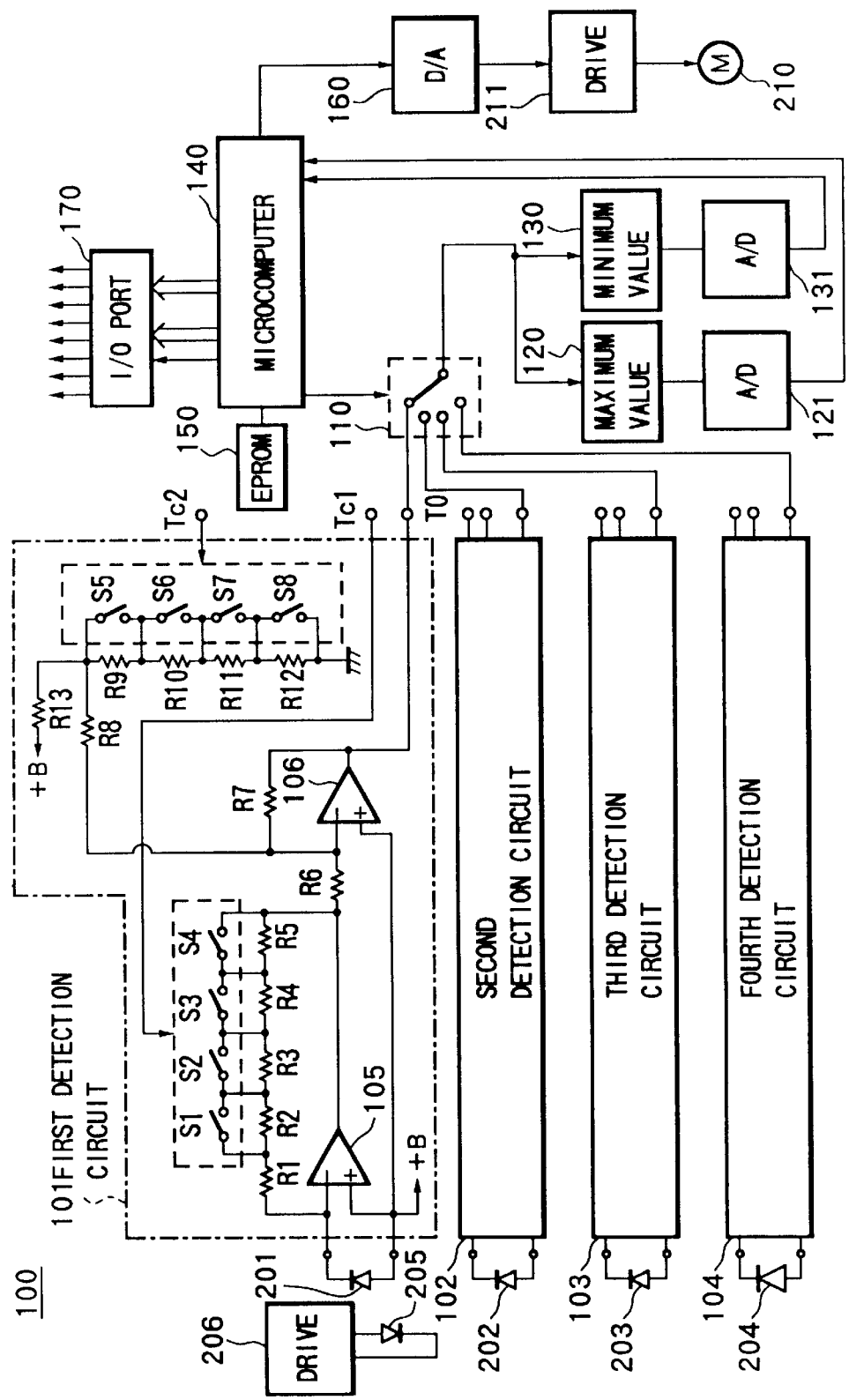

DISK DRIVE, POSITION DETECTION DEVICE AND METHOD OF CORRECTION OF POSITION DETECTION SIGNAL

BACKGROUND OF THE INVENTION

1. Field of the Invention

The present invention relates to a disk drive having a tracking position detection device enabling position detection of fine pitches by using one or two pairs of position detection signals of mutually inverted phases, a position detection device for position detection of a head of a hard disk drive and other applications requiring high precision, and a method of correction of the position detection signals.

2. Description of the Related Art

As a preferred circuit for position detection of, for example, a head of a disk drive, Japanese Unexamined Patent Publication (Kokai) No. 2-226012 discloses an optical position detection circuit configured as shown in FIG. 7.

The position detection circuit 100 is connected to four light receiving elements (photo diodes) 201 to 204 as shown in FIG. 7. The photo diodes 201 to 204 are struck by light from a light emitting diode 205 controlled by a drive circuit 206. Between the light emitting diode 205 and the photo diodes 201 to 204, while not particularly shown, are interposed two light blocking plates each provided with a plurality of rectangular slits. One is called a "scale" and has slits repeatedly arranged at a certain pitch in its longitudinal direction. The other is called a "reticle", is a light blocking plate which moves in one direction together with a head, and has four slits arranged in a positional relationship a little different from the slits of the scale. The pitches and positional relationship of the slits on the scale and reticle are set so that the superimposed widths of the slits as seen from the light receiving side repeatedly increase and decrease substantially linearly when the head is moved at a constant speed and so that the phase of the repetition is shifted 90 degrees each. Thus, the four photo diodes 201 to 204 output triangular wave-shaped position detection signals having phases shifted by 90 degrees as the head moves.

The position detection circuit 100 shown in FIG. 7 comprises first to fourth detection circuits 101 to 104, a selector 110, a maximum value detection circuit 120, a minimum value detection circuit 130, analog-to-digital (A/D) converters 121 and 131, a microcomputer 140, an erasable programmable read only memory (EPROM) 150, a digital-to-analog (D/A) converter 160, an input-output (I/O) port 170, etc.

The first to fourth detection circuits 101 to 104 are amplifying circuits of a current/voltage conversion type having a function of adjusting a gain and a voltage offset.

The detection circuits 101 to 104 each comprise, as representatively illustrated by the first detection circuit 101, two operational amplifiers 105 and 106, 13 resistors R1 to R13, and eight switches S1 to S8.

Non-inverted inputs of the operational amplifiers 105 and 106 are connected to an anode of a photo diode 201, while the connecting point is connected to a supply line of a constant voltage +B. An inverted input of the first operational amplifier 105 is connected to a cathode of the photo diode 201. Between the inverted input and an output of the operational amplifier 105 are connected in series five resistors R1 to R5. The switches S1 to S4 are respectively connected in parallel to the two ends of the four resistors R2 to R4 among them.

An output of the operational amplifier 105 is connected to an inverted input of the operational amplifier 106 via the resistor R6. A feedback resistor R7 is connected between the inverted input and an output of the operational amplifier 106. Further, five resistors R8 to R12 are connected in series between the inverted input of the operational amplifier 106 and a ground potential. The switches S5 to S8 are respectively connected in parallel to the two ends of the four resistors R9 to R12 among them. A mid-point of connection between the resistor R8 closest to the inverted input of the operational amplifier 106 and the second closest resistor R9 is connected to a supply line of a constant voltage +B via the resistor R13.

The output of the operational amplifier 106 is connected to an output terminal To of a position detection signal. Also, a switch circuit including the switches S1 to S4 is connected to a first control terminal Tc1, while a switch circuit including the switches S5 to S8 is connected to a second control terminal Tc2.

In the first to fourth detection circuits 101 to 104 configured in this way, the switches S1 to S4 are appropriately switched in accordance with a control signal transmitted from the microcomputer 140 via the I/O port 170 and input from the first control terminal Tc1, whereby a feedback resistance value of the operational amplifier 105 changes and the gain is adjusted. Therefore, it is possible to adjust the amplitude of the position detection signal output from the output terminal To. Hereinafter, the adjustment of the amplitude of the position detection signal will be referred to as "gain adjustment".

On the other hand, the switches S5 to S8 are appropriately switched in accordance with a control signal transmitted from the microcomputer 140 via the I/O port 170 and input from a second control terminal Tc2, whereby the potential of the inverted input of the operational amplifier 106 changes. Therefore, the direct current voltage level of a position detection signal output from the output terminal To can be adjusted. Hereinafter, the adjustment of the direct current voltage level of the position detection signal will be referred to as "offset adjustment".

At the time of the gain adjustment and the offset adjustment, one of the four position detection signals is selected by a selector 110 controlled by the microcomputer 140. The selected position detection signal is input to the maximum value detection circuit 120 and the minimum value detection circuit 130, which detect the maximum value and minimum value of the amplitude. The detected values are converted to digital signals by the A/D converters 121 and 131 and then input to the microcomputer 140.

Such detection of a maximum value and a minimum value of the amplitude is performed for all position detection signals by successively switching the selector 110.

The microcomputer 140 calculates a difference and sum of the maximum value and the minimum value of the amplitude for each of the position detection signals. Based on the calculation results, the microcomputer 140 controls the switches S1 to S4 in the detection circuits and performs gain adjustment so that the differences between the maximum value and the minimum value align at a constant value. Also, the microcomputer 140 controls the switches S5 to S8 in the detection circuits and performs offset adjustment so that the sums of the maximum value and the minimum value align at a constant value. The EPROM 150 stores control data of the switches at the time of the gain adjustment and the offset adjustment.

The microcomputer 140 then converts the control signal of a voice coil motor 210 from a digital to analog format, then transmits the same to the motor drive circuit 211.

The position detection device 100 configured in this way can use the four position detection signals having phases successively shifted by 90 degrees to perform position detection by a pitch four times finer than the pitch of the slits provided on the scale.

Also, under control by the microcomputer, gain adjustment and offset adjustment of the position detection signals can be automatically performed based on control data stored in advance.

Summarizing the problem to be solved by the present invention, the position detection device 100 of the related art had the resistors R1 to R5 and switches S1 to S4 for the gain adjustment and the resistors R8 to R12 and switches S5 to S8 for the offset adjustment in the first to fourth detection circuits 101 to 104 provided corresponding to the four position detection signals so had a large number of components and was large in the size of the detection circuits is large. If desiring to further improve the precision of the gain and offset adjustment, it is necessary to provide still larger number of resistors and switches.

Also, the maximum value detection circuit 120 and the minimum value detection circuit 130 are also necessary.

Therefore, it is difficult to make the position detection device 100 of the related art smaller in size.

Furthermore, normally, there is some difference in characteristics among resistors and among switches. Further, the characteristic values vary in accordance with differences of temperature characteristics. Therefore, there is a disadvantage that the precision at the time of gain and offset adjustment easily declines.

In the position detection device of the related art, it is not known at first how much the gain and offset are deviated, so the amounts of deviation of the gain and offset are calculated from the maximum value and minimum value, then the position detection signal is corrected by controlling the detection circuits based on the calculation results. After that, a motor is driven based on the corrected position detection signal. Accordingly, correction of the position detection signal takes time. This is disadvantageous in terms of the production efficiency and production costs. Also, when the position detection signal is corrected during use, the time taken by the correction becomes a cause reducing the response in control.

SUMMARY OF THE INVENTION

An object of the present invention is to provide a position detection device comprising a small number of components and therefore advantageous in terms of reduction of size and cost, not requiring a long time for correction, and capable of correcting the position detection signal simply and with a high precision and a method of correction of a position detection signal.

According to a first aspect of the present invention, there is provided a disk drive comprising: a head arm having a head; a motor for rotating the head arm on an axis thereof to move the head in a direction across a track on a disk; a tracking position detection device for detecting a tracking position of the head by detecting a position of the head arm portion moving with the head; and a motor drive portion for driving the motor in accordance with the tracking portion detected by the tracking position detection device, wherein the tracking position detection device comprises, a detector for detecting a position of the head arm portion and outputting two position detection signals having a predetermined phase difference as the head moves; and a signal processor for performing signal processing based on the two position detection signals, detecting the tracking position and outputting the detection result to said motor drive portion.

Preferably, the detector outputs two position detection signals having a phase difference of 180 degrees along with movement of the head and the signal processor obtains an offset voltage level by averaging the two position detection signals and shifts a position detection signal so that a reference voltage level of a center of amplitude matches the obtained offset voltage level.

Preferably, the detector outputs four position detection signals having phases successively shifted by 90 degrees along with movement of the head and a signal processor obtains an offset voltage level by averaging the two position detection signals and shifts a position detection signal so that a reference voltage level of a center of amplitude matches the obtained offset voltage level.

According to a second aspect of the present invention, there is provided a position detection device, comprising a detector for detecting a position an object to be detected and outputting two position detection signals having a phase difference of 180 degrees along with movement of the object and a signal processor for obtaining an offset voltage level by averaging the two position detection signals and shifting the position detection signals so that reference voltage levels of centers of amplitude match with the obtained offset voltage level.

According to a third aspect of the present invention, there is provided a position detection device, comprising a detector for detecting a position of an object to be detected and outputting four position detection signals having phases successively shifted by 90 degrees along with movement of the object and a signal processor for obtaining an offset voltage level by averaging the four position detection signals and shifting the position detection signals so that reference voltage levels of the centers of amplitude match with the obtained offset voltage level.

Preferably, the signal processor corrects amplitudes of the position detection signals by using two position detection signals having a phase difference of 90 degrees among the four position detection signals.

For example, the signal processor obtains the maximum value and minimum value of the amplitude from the two position detection signals shifted in phase by 90 degrees and increases or reduces the amplitude of a position detection signal so as to give the obtained maximum value and the minimum value. In that case, preferably, the signal processor corrects the offset, obtains the maximum value, and obtains the minimum value by subtracting from the shifted reference voltage the voltage difference between the obtained maximum value and the shifted reference voltage.

Preferably, the signal processor obtains the maximum value and minimum value of amplitude from the two position detection signals having a phase difference of 90 degrees and expands or reduces the amplitude of a position detection signal to give the obtained maximum value and minimum value.

In that case, preferably the signal processor averages the added result within a predetermined phase range and regards the obtained average value as the maximum value.

Alternatively, the signal processor obtains a first added value by adding absolute values of a first position detection signal and a second position detection signal having a phase 90 degrees advanced with respect to the first position detection signal, obtains a second added value by adding absolute values of a third detection signal having a phase 90 degrees delayed with respect to the first position detection signal and the first position detection signal, and averages the first and second added values to obtain the maximum value.

Alternatively, the signal processor obtains a first added value by adding absolute values of a first and second position detection signals having a phase difference of 90 degrees, obtains a second added value by adding absolute values of a third and a fourth position detection signals respectively having a phase difference of 180 degrees with respect to the first and second position detection signals, and averages the first and second added values to obtain the maximum value.

Alternatively, the signal processor corrects the obtained maximum value. For example, the signal processor obtains points where two position detection signals having a phase difference of 90 degree cross center lines of amplitude and corrects the maximum value based on the crossing points.

Alternatively, the signal processor obtains the maximum value, then obtains points where two position detection signals having a phase difference of 180 degrees cross center lines of amplitude, and confirms whether phase differences between the crossing points and the maximum value are within a predetermined range.

Preferably, the detector comprises a light emitter; a reticle having a plurality of slits; a scale having a plurality of slits repeating at a constant pitch and relatively moving with respect to the reticle along with movement of an object being detected; and a light receiver for receiving light from the light emitter passing through the reticle and the scale and outputting four position detection signals having phases successively shifted by 90 degrees forming triangular waves due to a change of relative positions of the slits along with movement of the scale.

Preferably, between the detector and the signal processor is provided a detection circuit for amplifying the four position detection signals from the detector by a constant amplifying rate and a constant direct current voltage level.

Preferably, the position detection device further comprises a selector for selecting one of the four position detection signals and an A/D converter for converting a position detection signal selected by the selector from an analog signal to a digital signal and outputting the result to the signal processor.

Further, the position detection device further comprises a memory for storing at least one of the position detection signals and calculation results of the signal processor.

The disk drive or position detection device configured in this way converts the position detection signal before correction to a digital signal by the A/D converter and inputs it to the signal processor.

The signal processor first corrects the offset. Specifically, it averages all of the one or two pairs of position detection signals of inverted phases. As a result, the alternating current voltage components are canceled out and an average value of a direct current voltage level (an offset average value) is finally obtained. Since the offset average value can be regarded as an approximate offset voltage value for the position detection signals, the position detection signals are shifted so that the reference voltage level of the center amplitude matches with the calculated offset average value.

Next, the signal processor obtains the maximum value for amplitude correction. Specifically, there are cases of using two position detection signals having a phase difference of 90 degrees, using three position detection signals consisting of any one position detection signal and two position detection signals with phase differences of ±90 degrees with respect to that signal, and using four position detection signals having phases successively shifted by 90 degrees. In all of these cases, basically the absolute values between two signals having a phase difference of 90 degrees are added. As a result of the addition, an almost constant voltage alternately becoming the maximum values of the two signals every time the phase advances by 90 degrees can be obtained. There is no problem if the maximum values of the two signals are the same, but when they are different, they are further averaged.

Then, the signal processor subtracts the difference between the maximum value and the reference voltage level from the reference voltage level to obtain a minimum value.

The difference between the maximum value and the minimum value obtained as explained above can be regarded as an approximate amplitude of the position detection signals.

Since it is important for position detection signals that an offset value and an amplitude match between signals, it is preferable to then drive for example a motor etc. based on the position detection signal corrected by the approximate offset value and amplitude.

Note that when strictly correcting signals, it is preferable to correct the obtained maximum value and further adjust the offset. Specifically, for example, it is preferable to obtain crossing points of signals having a phase difference of 90 degrees with a center line of amplitude and to obtain a maximum value again by using the crossing points. Also, it is possible to examine how much the crossing points of two signals having a phase difference of 180 degrees match with a phase of a maximum value and a minimum value of a signal having a phase difference of 90 degrees with respect to the two signals and confirm the condition of the offset adjustment by this.

In the present invention, as explained above, the gains and direct current voltage levels in the detection circuits are made constant and offset adjustment and amplitude adjustment on output position detection signals are all performed in a signal processor.

BRIEF DESCRIPTION OF THE DRAWINGS

These and other objects and features of the present invention will become clearer from the following description of the preferred embodiments given with reference to the accompanying drawings, in which:

FIGS. 6A to 6D are waveform diagrams of position detection signals; and

FIG. 7 is a circuit diagram of an optical position detection circuit of the related art.

DESCRIPTION OF THE PREFERRED EMBODIMENTS

Below, preferred embodiments of the present invention will be described using as an example a head position detection device of a hard disk drive.

Figure 1:
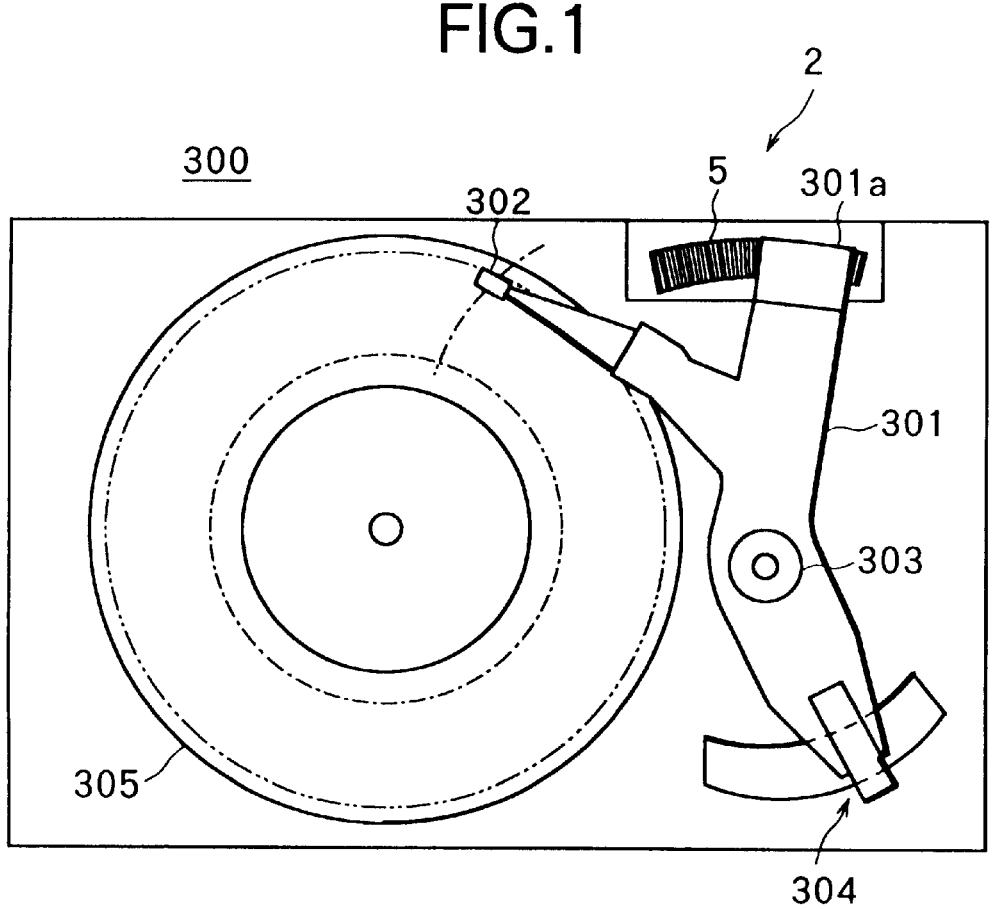
FIG. 1 is a view of the configuration of the inside of a hard disk drive provided with a position detection device according to an embodiment of the present invention.
Figure 2:
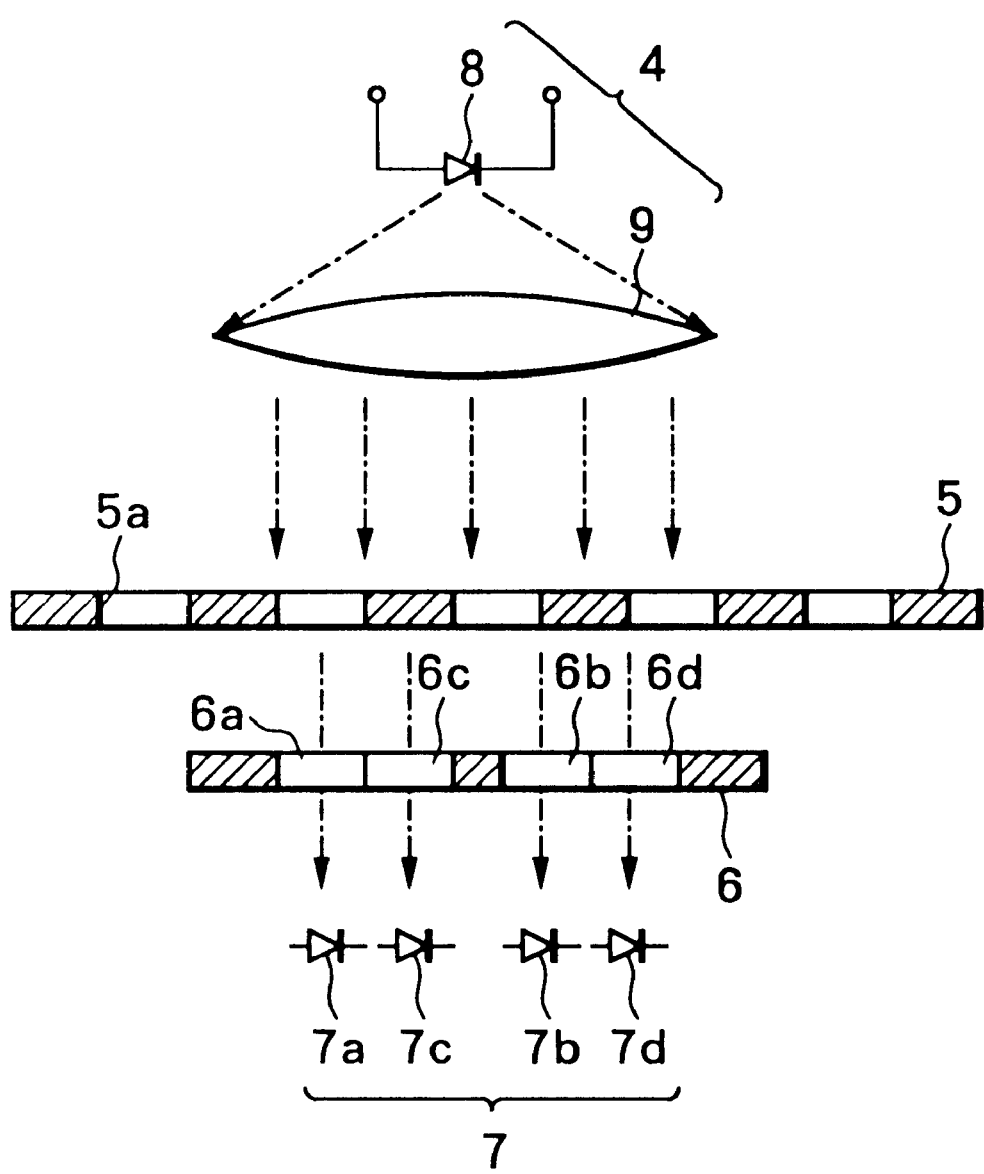
FIG. 2 is a view of the positional relationship of the components of a position detection device.

FIG. 1 is a view of the configuration of the inside a hard disk drive provided with a position detection device according to the present invention. FIG. 2 is a view of the positional relationship of the components of the position detection device.

A hard disk drive 300 has, as shown in FIG. 1, a Y-shaped head arm 301 to which one end is attached a head 302. On another end across from a shaft 303 is provided a voice coil motor 304 for moving the head 302 in the radial direction of a magnetic disk 305 drived by a motor drive portion 304a. On still another end other than the attachment portion of the head 302 is provided a position detection device.

The position detection device is roughly comprised by a detector 2, an electronic circuit portion 3 and driver.

The detector 2 comprises, as shown in FIG. 2, a light emitter 4, scale 5, reticle 6, and light receiver 7.

The light emitter 4 comprises a light emitting diode 8 and a lens 9 for converting light from the light emitting diode 8 to parallel light in a certain wide region.

The driver comprises a motor 204 and a motor control portion 204a.

Figure 3A:
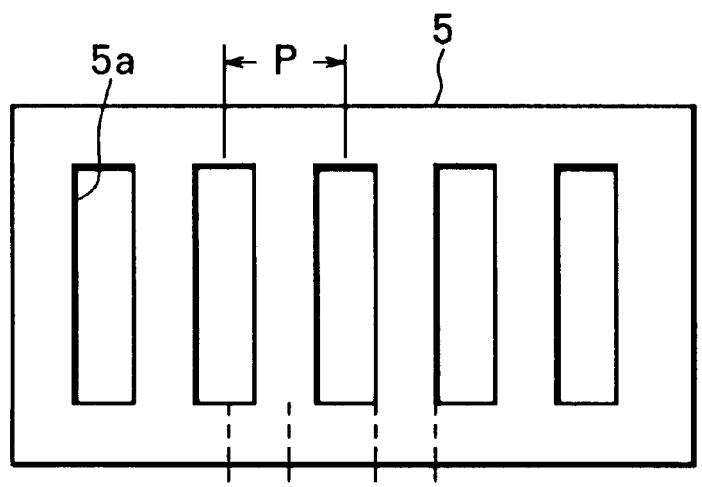
FIGS. 3A and 3B are plan views of a scale and a reticle.
Figure 3B:
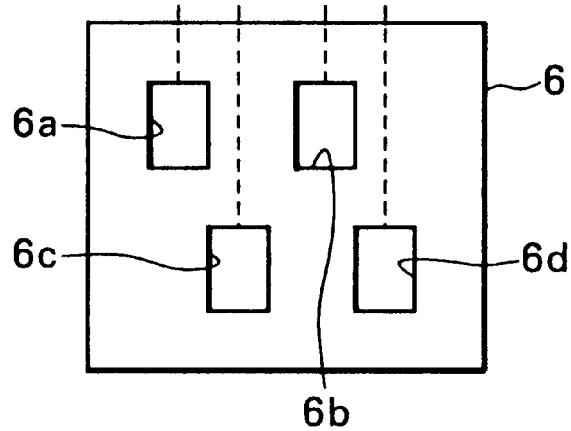

The scale 5 and the reticle 6 are types of light blocking plates formed with slits in specific patterns. FIGS. 3A and 3B are plan views of the scale and reticle.

The scale 5, as shown in FIG. 1, has a long arc shape mildly curved along the direction of movement of the end of the head arm. As shown in FIG. 3A, a large number of slits 5a are repeatedly formed at a certain pitch P in the longitudinal direction of the scale 5. The slits 5a are of a long line shape in the width direction of the scale 5.

On the other hand, the reticle 6 is a light blocking plate fixed to the end of the head arm and moves relatively with respect to the scale 5. For example, as shown in FIG. 3B, the reticle 6 has four slits 6a, 6b, 6c, and 6d arranged in two rows, an upper and lower one, in the range of the slit length on the scale 5 and shifted by a pitch of a unit of (1/4)P. In the example of FIG. 3B, the center axis of the left-most slit 6a is made to match the center axis of the slit 5a on the scale side. In that state, the other slits 6b, 6c, and 6d are provided at positions away from the slit 6a by (1+1/4)P, (2/4)P, and (1+3/4)P. Note that the important point here is that distances from any one slit to the other three slits differ by units of (1/4)P. Accordingly, these distances may be any whole multiples of P. Further, the slits may be formed in two rows or one row.

As shown in FIG. 2, at positions close to the slits 6a to 6d of the reticle 6 are arranged four photo diodes 7a to 7d composing the light receiver 7.

Among the components of the detection unit 2, only the scale 5 is fixed to the body of the disk drive. The other components, that is, the light emitting diode 8, lens 9, reticle 6, and photo diodes 7a to 7d are fixed inside a cover 301a provided at the end of the head arm in FIG. 1 in the relative positional relationship shown in FIG. 2.

Note that the electronic circuit portion 3 to which outputs of the photo diodes 7a to 7d are connected is attached inside the cover 301a of the head arm 301 or fixed in the body of the disk drive by wires from near the shaft 303.

Figure 4:
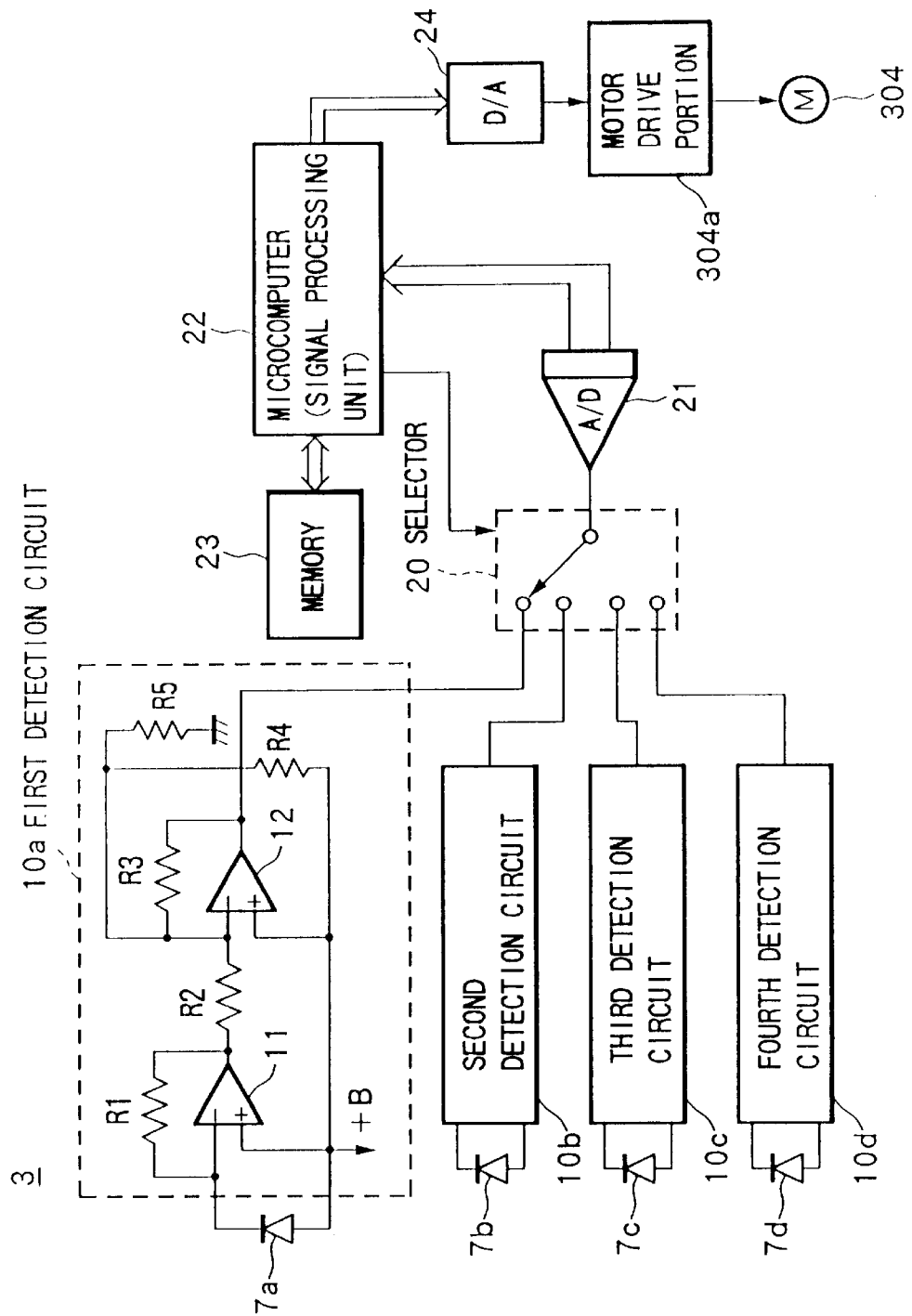
FIG. 4 is a circuit diagram of the schematic configuration of an electronic circuit unit.

FIG. 4 is a circuit diagram of the general configuration of the electronic circuit portion 3 together with a photo diode, motor, and a motor drive portion.

The electronic circuit portion 3 comprises first to fourth four detection circuits 10a, 10b, 10c, and 10d, a selector 20, an A/D converter 21, a microcomputer 22 serving a signal processor, a memory 23 such as a random access memory (RAM) or an electrically erasable and programmable read only memory (EEPROM) as a memory unit, and a D/A converter 24.

The four detection circuits each comprise, as representatively shown by the first detection circuit 10a, two operational amplifiers 11 and 12 and five resistors R1 to R5.

Non-inverted inputs of the two operational amplifiers 11 and 12 are connected to an anode of the photo diode 7a and the supply line of a predetermined voltage +B. An inverted input of the first operational amplifier 11 is connected to a cathode of the photo diode 7a, while a feedback resistor R1 is connected between the inverted input and an output of the operational amplifier 11. The output of the operational amplifier 11 is connected to the inverted input of the next operational amplifier 12 via the resistor R2. Between the inverted input and output of the operational amplifier 12 is connected a feedback resistor R3. The inverted input is connected to a connection mid-point of the resistors R4 and R5 connected in series between the supply line of the predetermined voltage +B and a ground line. A position detection signal is taken out from the output of the operational amplifier 12.

In the detection circuit, gains of the operational amplifiers are determined by the feedback resistors R1 and R3 having a constant resistence value. A direct-current voltage level of the output signal is fixed at a constant potential which is obtained by dividing a constant voltage +B by the resistance ratio of the resistors R4 and R5. Values of these resistors R1 to R5 are set in advance based on data of variation of the gain or offset level obtained from evaluations.

In the selector 20, the four inputs are connected to the outputs of the first to fourth detection circuits, namely, to the outputs of the operational amplifier 12 of the respective circuits. Also, between the output of the selector 20 and the microcomputer 22 is connected an A/D converter 21. Therefore, after the position detection signals from the photo diodes 7a to 7d are amplified in the corresponding detection circuit, the signals are successively selected by the selector 20 controlled by the microcomputer 22, converted to digital signals by the A/D converter 21, and successively input to the microcomputer 22.

The memory 23 stores the positional detection signals converted to digital signals or their maximum value, minimum value, etc. Other than providing it outside the microcomputer 22 as shown in the figure, a memory region inside the microcomputer 22 may be also used.

Note that as a modification, the selector 20 may be omitted and one A/D converter each, for a total of four, provided between the detection circuits 10a to 10d and the microcomputer 22.

In the position detection device configured in this way, the configurations of the first to fourth detection circuits 10a to 10d are simple. Further, the maximum value detection circuit and minimum value detection circuit are also unnecessary. Therefore, it is advantageous in reducing the size.

Next, a method of correction of a position detection signal using a position detection device configured in this way will be explained.

Figure 5:
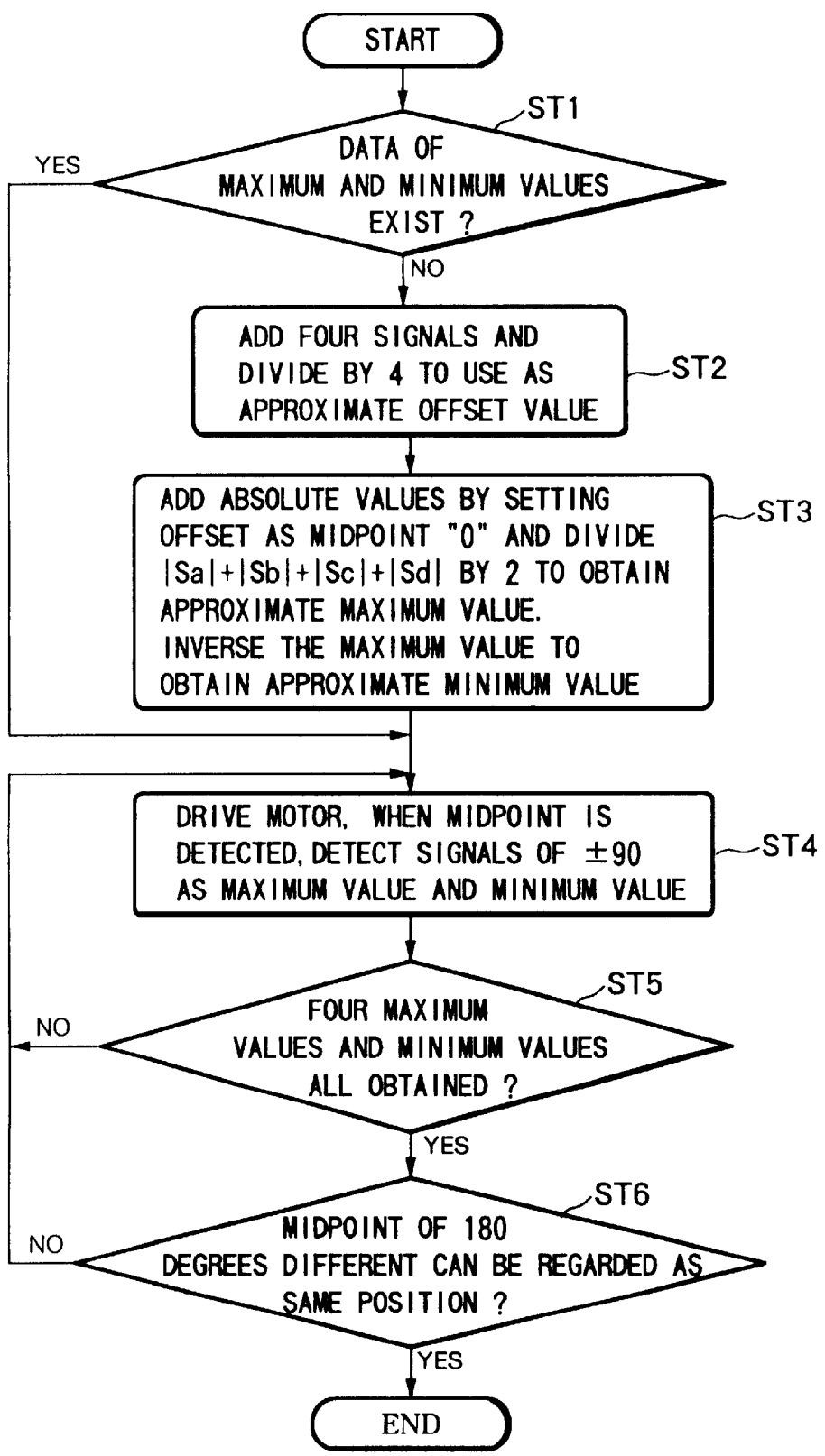
FIG. 5 is a flow chart of a position detection method according to an embodiment of the present invention.

FIG. 5 is a flow chart of a method of correction of a position detection signal according to the present embodiment. Also, FIGS. 6A to 6D are waveform diagrams of position detection signals.

Now, assume that while switching the selector 20 or when providing four A/D converters in parallel, a position detection signals from the first to fourth detection circuits 10a to 10d are converted to digital signals, then stored in the memory 23. The processing for position detection explained below is executed as internal calculation while the microcomputer 22 appropriately reads position detection signals from the memory 23.

First, for example, at the time of turning on the power, at step ST1, the microcomputer 22 examines whether or not a maximum value and minimum value of a desired position detection signal are stored in the memory 23.

When there is already the maximum value and the minimum value, the microcomputer 22 skips in the processing flow to before step ST4.

When there is no maximum value and minimum value, it finds a general offset voltage level at step ST2. Specifically, it adds four position detection signals and divides the result by four, that is, obtains the mean value of the position detection signals, so as to find the general offset voltage level. The reason will be explained below using formulas.

Now, assume that the position detection signals (triangular wave signals) output from the first to fourth detection circuits 10a, 10b, 10c, and 10d are Sa, Sb, Sc, and Sd. Also, the direct-current levels (offset voltage levels) of the signals are OFa, OFb, OFc, and OFd and values of half of the peak-to-peak voltages of the signals are Va, Vb, Vc, and Vd. The Fourier series expansions of the four triangular wave signals Sa, Sb, Sc, and Sd become as shown in formulas (1) to (4) below:

$$Sa = OFa + 8Va \cdot [\sin\theta - (1/9)\sin 3\theta + (1/25)\sin 5\theta - \ldots]/\pi^2 \quad \ldots (1)$$

$$Sb = OFb + 8Vb \cdot [\sin(\theta+270) - (1/9)\sin 3(\theta+270) + (1/25)\sin 5(\theta+270) - \ldots]/\pi^2 \quad \ldots (2)$$

$$Sc = OFc + 8Vc \cdot [\sin(\theta+180) - (1/9)\sin 3(\theta+180) + (1/25)\sin 5(\theta+180) - \ldots]/\pi^2 \quad \ldots (3)$$

$$Sd = OFd + 8Vd \cdot [\sin(\theta+90) - (1/9)\sin 3(\theta+90) + (1/25)\sin 5(\theta+90) - \ldots]/\pi^2 \quad \ldots (4)$$

Here, for simplification, assume that the offset voltage levels are equal, that is, OFa=OFb=OFc=OFd=OF.

Since $\sin(\theta+180)=-\sin\theta$, when adding the position detection signals Sa and Sc, the $\theta$ function terms on the right sides of formulas (1) and (3) are all deleted and Sa+Sc=OFa+OFc=2·OF is established.

In the same way, when adding the position detection signals Sb and Sd, the $\theta$ function terms on the right sides of the formulas (2) and (4) are all deleted by using the relationship $\sin(\theta+270)=-\sin(\theta+90)$, so Sb+Sd=OFb+OFd=2·OF is established.

In the end, the sum of the four position detection signals becomes 4·OF. A general offset voltage level OF can be obtained by dividing this by four.

Then, the direct-current voltage levels of the position detection signals are moved exactly by the obtained offset voltage level OF. As a result, the offset is corrected.

At step ST3, the microcomputer 22 finds the general maximum value of a position detection signal. Specifically, it adds the absolute values of four position detection signals and divides the result by 2 to find the general maximum value. The reason will be explained below by using formulas.

Now, assume that the above correction of the offset results in zero offsets at the center lines of amplitudes of the position detection signals. At this time, two detection signals Sa and Sb having a phase difference of 90 degrees indicated by formulas (1) and (2) can be expressed by four different straight lines when viewed by every 90 degrees as will be understood from FIG. 6. Accordingly, when looking at the first cycle, the position detection signal Sa can be rewritten to formulas (1-1) to (1-4) and the position detection signal Sb can be rewritten to formulas (2-1) to (2-4).

$$Sa1(0\sim90) = Va \cdot \theta/90 \quad \ldots (1\text{-}1)$$
$$Sa2(90\sim180) = Va - Va(\theta-90)/90 \quad \ldots (1\text{-}2)$$
$$Sa3(180\sim270) = -Va(\theta-180)/90 \quad \ldots (1\text{-}3)$$
$$Sa4(270\sim360) = -Va + Va(\theta-270)/90 \quad \ldots (1\text{-}4)$$
$$Sb1(0\sim90) = -Vb + Vb \cdot \theta/90 \quad \ldots (2\text{-}1)$$
$$Sb2(90\sim180) = Vb(\theta-90)/90 \quad \ldots (2\text{-}2)$$
$$Sb3(180\sim270) = Vb - Vb(\theta-180)/90 \quad \ldots (2\text{-}3)$$
$$Sb4(270\sim360) = -Vb(\theta-270)/90 \quad \ldots (2\text{-}4)$$

Next, the absolute values of the above lines Sa1 to Sa4 and Sb1 to Sb4 are obtained. The negative or positive sign of the absolute values is determined by whether the lines are higher or lower than a reference voltage level in FIG. 6. Namely, an absolute value of a line in a range higher than the reference voltage level becomes as in the formula of the line as it is, while an absolute value of a line in a range lower than the reference voltage level becomes the formula of the line multiplied by −1. Accordingly, formulas (3-1) to (4-4) below can be derived from the above formulas (1-1) to (2-4):

$$|Sa1| = Va \cdot \theta/90 \quad \ldots (3\text{-}1)$$
$$|Sa2| = Va - Va(\theta-90)/90 \quad \ldots (3\text{-}2)$$
$$|Sa3| = Va(\theta-180)/90 \quad \ldots (3\text{-}3)$$
$$|Sa4| = Va - Va(\theta-270)/90 \quad \ldots (3\text{-}4)$$
$$|Sa1| = Vb - Vb \cdot \theta/90 \quad \ldots (4\text{-}1)$$
$$|Sa2| = Vb(\theta-90)/90 \quad \ldots (4\text{-}2)$$
$$|Sa3| = Vb - Vb(\theta-180)/90 \quad \ldots (4\text{-}3)$$
$$|Sa4| = Vb(\theta-270)/90 \quad \ldots (4\text{-}4)$$

Here, when $Va \approx Vb \equiv V_0$, from the above formulas (3-1) to (4-4), the sums of absolute values of position detection signals in the sections where $\theta$ is 0 to 90 degrees, 90 to 180 degrees, 180 to 270 degrees, and 270 to 360 degrees all become $V_0$. Namely, $|Sa1|+|Sb1|=|Sa2|+|Sb2|=|Sa3|+|Sb3|=|Sa4|+|Sb4|=V_0$ is established. The voltage value $V_0$ is half of a peak-to-peak voltage value of the position detection signal.

The sums of the absolute values of the position detection signals become a constant voltage value in the above way when the phase difference of two position detection signals is 90 degrees. At step ST3 in FIG. 5, absolute values of four position detection signals are all added, so it is assumed that $Va \approx Vb \approx Vc \approx Vd \equiv V_0$ and the added value becomes $2V_0$. A value $V_0$ obtained by dividing the added value by 2 can be regarded as the general maximum value Vmax.

The minimum value Vmin of a position detection signal is a voltage value of a point moved symmetrically from a center point, that is, the reference voltage level, by the same amount as the maximum value Vmax. Therefore, when the reference voltage level is 0, the minimum value can be obtained by Vmin=−Vmax.

By increasing or decreasing the amplitude magnifications of a position detection signal so as to give the maximum value Vmax and the minimum value Vmin found from the above, the amplitude correction is completed. The obtained maximum value Vmax and the minimum value Vmin are stored in the memory 23.

In the present embodiment, since the maximum value and minimum value are already known, by examining how much a detection value is away from the reference voltage level in the positive or negative direction at that point, the present scale position is found unambiguously.

Next, in the present embodiment, for example, at the time of adjustment at shipping or at the time of normal use, an offset voltage level, maximum value, and minimum value of a further higher precision are obtained at steps ST4 to ST6.

At step ST4, the microcomputer 22 controls the motor control portion 304a to drives the motor 304 based on the position detection signal corrected in the above steps ST1 to ST3 until the midpoint where one of two position detection signals having a phase difference of 90 degrees becomes a reference voltage level. At this time, the value of the other position detection signal is read. The voltage value of the read position detection signal becomes a maximum or minimum value of amplitude when assuming the offset voltage level is zero.

By using this and alternately repeatedly driving the motor and reading the voltage, the maximum value and minimum value of all of the position detection signals are obtained.

At step ST5, it is judged whether the maximum value and minimum value have been detected for all position detection signals. When not, the routine returns to step ST4.

When the maximum value and minimum value are detected for all position detection signals, at step ST6, it is judged whether or not the offset has been sufficiently adjusted. Specifically, for example, the maximum value or minimum value of any position detection signal to focused on and the degree of match of the phase between that point and the points of the reference potential level of two position detection signals having a phase difference of ±90 degrees is checked. When the phase differences between the focused point and the two reference potential level points are within a predetermined tolerance, it is judged that the offset was sufficiently adjusted, while when outside the tolerance, the offset is adjusted again, then the processing is completed.

Next, the corrected position detection signal is converted from a digital to analog format and used as a signal for driving the voice coil motor 304.

Note that when the offset is extremely large at the time of judgement, it is also possible to judge that some sort of abnormality has occurred due to strong impact etc. at the time of use and inform the user of the abnormality.

In such a position detection method, all processing for adjusting the offset and amplitude is performed in a signal processor such as a microcomputer. Feedback to the first to fourth detection circuits is not necessary. Thus, there is the advantage that it does not take a long time for adjusting the offset and amplitude.

Also, since the precision of adjustment of the offset and amplitude is not affected by variations in characteristics among elements of the first to fourth detection circuits, variation of temperature characteristics, etc., there is the advantage that the precision is high. Therefore, the response of control is good and signals can be corrected in real time at all times, so it is possible to detect a position at the highest precision for each time even with changes in the environment. Especially, when using four A/D converters, by controlling the motor drive at the time of shipping adjustment to be slower near the mid-points etc., inexpensive delta-sigma ($\Delta$-$\Sigma$) modulation type A/D converters can be used as the A/D converters, so there is the advantage of decreasing a cost load.

Furthermore, it is easy to judge the completion of the correction, so the method is suited to automatic correction.

Note that a variety of modifications are possible in the present embodiment.

For example, at step ST3, the absolute values of the four position detection signals were all added, but the absolute values of any two position detection signals having a phase difference of 90 degrees may be added and the added result regarded as an approximate maximum value.

Also, it is possible to use three position detection signals, that is, any position detection signal and position detection signals having phase differences of ±90 degrees with respect to the position detection signal. At this time, a first added value is obtained by the sum of the absolute value of any position detection signal and the absolute value of the position detection signal having a phase advanced by 90 degrees and a second added value is obtained by the sum of the absolute value of that first position detection signal and the absolute value of the position detection signal having a phase delayed 90 degrees. Then, the sum of the first and the second added values is divided to obtain a mean value. This is regarded as the maximum value.

This invention can be applied to detection of a track position on other type disk, for example optical disk or magneto-optical disk etc.

Summarizing the effects of the invention, according to the position detection device according to the present invention, since the configurations of the first to fourth detection circuits are simple and a maximum value detection circuit and a minimum value detection circuit are unnecessary, the size can be reduced. Therefore, it is easy to reduce the costs.

According to the position detection method of the present invention, since all processing regarding adjustment of an offset and amplitude is performed in a signal processor such as a microcomputer and feedback to the first to fourth detection circuits is not necessary, the adjustment of the offset and amplitude does not take a long time.

Also, since the precision of adjustment of the offset and amplitude is not affected by variations in characteristics among elements of the first to fourth detection circuits, variation of temperature characteristics, etc., the precision is high. Therefore, the response of control is good and signals can be corrected in real time at all times, so it is possible to detect a position at the highest precision for each time even with changes in the environment.

Furthermore, it is easy to judge the completion of the correction, so the method is suited to automation.

While the invention has been described with reference to specific embodiment chosen for purpose of illustration, it should be apparent that numerous modifications could be made thereto by those skilled in the art without departing from the basic concept and scope of the invention.

What is claimed is:

1. A disk drive comprising:
   a head arm having a head;
   a motor for rotating said head arm on an axis thereof to move said head in a direction across a track on a disk;
   a tracking position detection device for detecting a tracking position of said head by detecting a position of said head arm portion moving with said head; and
   a motor drive portion for driving said motor based on information from said tracking position detection device, wherein said tracking position detection device comprises,
a detector for outputting two position detection signals having a predetermined phase difference as said head moves; and
a signal processor for performing signal processing on said two position detection signals and for providing information used in controlling the motor wherein said detector outputs two position detection signals having a phase difference of 180 degrees along with movement of said head; and
said signal processor obtains a reference voltage level by averaging said two position detection signals.

2. A disk drive comprising:
a head arm having a head;
a motor for rotating said head arm on an axis thereof to move said head in a direction across a track on a disk;
a tracking position detection device for detecting a tracking position of said head by detecting a position of said head arm portion moving with said head; and
a motor drive portion for driving said motor based on information from said tracking position detection device,
wherein said tracking position detection device comprises,
a detector for outputting two position detection signals having a predetermined phase difference as said head moves; and
a signal processor for performing signal processing on said two position detection signals and providing information used in controlling the motor,
and further wherein said detector outputs four position detection signals having phases successively shifted by 90 degrees along with movement of said head; and
a signal processor obtains a reference voltage level by averaging at least two of said position detection signals.

3. A disk drive as set forth in claim 2, wherein said signal processor corrects an amplitude of a position detection signal by using two position detection signals having a phase difference of 90 degrees.

4. A disk drive as set forth in claim 3, wherein said signal processor obtains a maximum value and a minimum value of amplitude from said two position detection signals having a phase difference of 90 degrees.

5. A disk drive as set forth in claim 4, wherein said signal processor determines a reference level, obtains said maximum value, and obtains a minimum value.

6. A disk drive as set forth in claim 4, wherein said signal processor adds absolute values of two position detection signals having a phase difference of 90 degrees and obtains the above maximum value from the added result.

7. A disk drive as set forth in claim 6, wherein said signal processor averages said added result within a predetermined phase range and regards the obtained average value as said maximum value.

8. A disk drive as set forth in claim 4, wherein said signal processor determines a first added value by adding absolute values of a first position detection signal and a second position detection signal having a phase 90 degrees advanced with respect to the first position detection signal, determines a second added value by adding absolute values of a third detection signal having a phase 90 degrees delayed with respect to said first position detection signal and said first position detection signal, and obtains said maximum value by averaging said first and second added values.

9. A disk drive as set forth in claim 4, wherein said signal processor obtains a first added value by adding absolute values of first and second position detection signals having a phase difference of 90 degrees, determines a second added value by adding absolute values of third and fourth position detection signals having a phase difference of 180 degrees with respect to the first and second position detection signals, and averaging averages said first and second added values to determine said maximum value.

10. A disk drive as set forth in claim 4, wherein said signal processor determines points where two position detection signals having a phase difference of 90 degree cross center lines of amplitude and corrects said maximum value based on the crossing points.

11. A disk drive as set forth in claim 4, wherein said signal processor determines said maximum value, then identifies points where two position detection signals having a phase difference of 180 degrees cross center lines of amplitude, and confirms whether phase differences between the crossing points and said maximum value are within a predetermined range.

12. A disk drive as set forth in claim 4, wherein said signal processor corrects said offset again based on said obtained maximum value and minimum value.

13. A disk drive as set forth in claim 2, wherein said detector comprises:
a light emitter;
a reticle having a plurality of slits;
a scale having a plurality of slits repeating at a constant pitch and relatively moves with respect to said reticle along with movement of an object being detected; and
a light receiver for receiving light from said light emitter passing through said reticle and said scale and outputting four position detection signals having phases successively shifted by 90 degrees forming triangular waves due to a change of relative positions of said slits along with movement of said scale.

14. A disk drive as set forth in claim 2, wherein between said detector and said signal processor is provided a detection circuit for amplifying said four position detection signals.

15. A disk drive as set forth in claim 2, further comprising:
a selector for selecting one of said four position detection signals; and
an A/D converter for converting a position detection signal selected from said selector from an analog signal to a digital signal and outputting the result to said signal processor.

16. A disk drive as set forth in claim 2, further comprising:
four A/D converters for converting said position detection signals from analog signals to digital signals and outputting the results to said signal processor.

17. A disk drive as set forth in claim 2, further comprising a memory for storing at least one of said position detection signal and calculation results of said signal processor.

18. A position detection device, comprising:
a detector for outputting two position detection signals having a phase difference of 180 degrees along with movement of the object; and
a signal processor for obtaining a reference voltage level by averaging said two position detection signals and determining a position based on a value of a measured position detection signal with respect to the reference voltage.

19. A position detection device, comprising:
a detector for outputting four position detection signals having phases successively shifted by 90 degrees along with movement of the object; and a signal processor for obtaining a reference voltage level by averaging said four position detection signals,
wherein said signal processor corrects an amplitude of a position detection signal by using two position detection signals having a phase difference of 90 degrees.

20. A position detection device as set forth in claim 19, wherein said signal processor determines a maximum value and minimum value of amplitude from said two position detection signals having a phase difference of 90 degrees.

21. A position detection device as set forth in claim 20, wherein said signal processor obtains a minimum value by subtracting from said reference voltage level a voltage difference between the obtained maximum value and the reference voltage level.

22. A position detection device as set forth in claim 20, wherein said signal processor adds absolute values of two position detection signals having a phase difference of 90 degrees and obtains the maximum value from the added result.

23. A position detection device as set forth in claim 22, wherein said signal processor averages said added result within a predetermined phase range and regards the obtained average value as said maximum value.

24. A position detection device as set forth in claim 20, wherein said signal processor obtains a first added value by adding absolute values of a first position detection signal and a second position detection signal having a phase 90 degrees advanced with respect to the first position detection signal, obtains a second added value by adding absolute values of a third detection signal having a phase 90 degrees delayed with respect to said first position detection signal and said first position detection signal, and averages said first and second added values to obtain said maximum value.

25. A position detection device as set forth in claim 20, wherein said signal processor determines a first added value by adding absolute values of a first and second position detection signals having a phase difference of 90 degrees, obtains a second added value by adding absolute values of a third and fourth position detection signals respectively having a phase difference of 180 degrees with respect to the first and second position detection signals, and averages said first and second added values to obtain said maximum value.

26. A position detection device as set forth in claim 20, wherein said signal processor determines points where two position detection signals having a phase difference of 90 degree cross center lines of amplitude and corrects said maximum value based on the crossing points.

27. A position detection device as set forth in claim 20, wherein said signal processor obtains said maximum value, then obtains points where two position detection signals having a phase difference of 180 degrees cross center lines of amplitude, and confirms whether a phase difference between the crossing points and said maximum value is within a predetermined range.

28. A position detection device as set forth in claim 20, wherein said signal processor corrects said reference based on said obtained maximum value and minimum value.

29. A position detection device, comprising:
a detector for outputting four position detection signals having phases successively shifted by 90 degrees along with movement of the object; and
a signal processor for obtaining a reference voltage level by averaging said four position detection signals;
wherein said detector comprises:
a light emitter;
a reticle having a plurality of slits;
a scale having a plurality of slits repeating at a constant pitch and relatively moving with respect to said reticle along with movement of an object being detected; and
a light receiver for receiving light from said light emitter passing through said reticle and said scale and outputting four position detection signals having phases successively shifted by 90 degrees forming triangular waves due to a change of relative positions of said slits along with movement of said scale.

30. A position detection device, comprising:
a detector for outputting four position detection signals having phases successively shifted by 90 degrees along with movement of the object; and
a signal processor for obtaining a reference voltage level by averaging said four position detection signals,
wherein between said detector and said signal processor is provided a detection circuit for amplifying said four position detection signals from the detector.

31. A position detection device, comprising:
a detector for outputting four position detection signals having phases successively shifted by 90 degrees along with movement of the object; and
a signal processor for obtaining a reference voltage level by averaging said four position detection signals further comprising:
a selector for selecting one of said four position detection signals; and
an A/D converter for converting a position detection signal selected by said selector from an analog signal to a-digital signal and outputting the result to said signal processor.

32. A position detection device, comprising:
a detector for outputting four position detection signals having phases successively shifted by 90 degrees along with movement of the object; and
a signal processor for obtaining a reference voltage level by averaging said four position detection signals further comprising:
four A/D converters for converting said position detection signals from analog signals to digital signals and outputting the results to said signal processor.

33. A position detection device, comprising:
a detector for outputting four position detection signals having phases successively shifted by 90 degrees along with movement of the object; and
a signal processor for obtaining a reference level by averaging said four position detection signals further comprising a memory for storing at least one of said position detection signals and calculation results from said signal processor.

34. A method of correction of a position detection signal, including the steps of:
obtaining a reference voltage level by averaging four position detection signals having phases successively shifted by 90 degrees output from a detector along with movement of an object being detected and further including the step of correcting an amplitude of a position detection signal by using two position detection signals having a phase difference of 90 degrees.

35. A method of correcting a position detection signal as set forth in claim 34, further including the steps of:
determining a maximum value and minimum value of amplitude from said two position detection signals having a phase difference of 90 degrees.

36. A method of correction of a position detection signal as set forth in claim 35, further including the steps of:

correcting said reference; and obtaining a minimum value by subtracting from said reference voltage level a voltage difference between the obtained maximum value and said reference voltage level.

37. A method of correction of a position detection signal as set forth in claim 36, further including the steps of:

averaging said added results within a predetermined phase range; and regarding the obtained average value as said maximum value.

38. A method of correction of a position detection signal as set forth in claim 35, further including the steps of:

adding absolute values of two position detection signals having a phase difference of 90 degrees; and obtaining said maximum value from the added result.

39. A method of correction of a position detection signal as set forth in claim 35, including the steps of:

obtaining a first added value by adding absolute values of a first position detection signal and a second detection signal having a phase advanced 90 degrees with respect to the first position detection signal;

obtaining a second added value by adding absolute values of a third position detection signal having a phase difference 90 degrees delayed from said first position detection signal and said first position detection signal; and averaging said first and second added values to obtain said maximum value.

40. A method of correction of a position detection signal as set forth in claim 35, further including the steps of:

obtaining a first added value by adding absolute values of first and second position detection signals having a phase difference of 90 degrees;

obtaining a second added value by adding absolute values of third and fourth position detection signals having phase differences of 180 degrees with respect to the first and second position detection signals; and averaging said first and second added values to obtain said maximum value.

41. A method of correction of a position detection signal as set forth in claim 35, further including the steps of:

obtaining points where two position detection signal having a phase difference of 90 degrees cross center lines of amplitude; and correcting said maximum value based on the crossing points.

42. A method of correction of a position detection signal as set forth in claim 35, further including the steps of:

obtaining the above maximum value, then obtaining points where two position detection signal having a phase difference of 180 degrees cross center lines of amplitude; and confirming whether phase differences between the crossing points and said maximum value are within a predetermined range.

43. A method of correction of a position detection signal as set forth in claim 35, further including the step of correcting said reference based on said obtained maximum value and minimum value.

* * * * *